United States Patent [19]
Eller

[11] Patent Number: 5,641,269
[45] Date of Patent: Jun. 24, 1997

[54] HELICOPTER ROTOR SEAL ASSEMBLY

[75] Inventor: John Eller, Southold, N.Y.

[73] Assignee: Royal Aviation, Mesa, Ariz.

[21] Appl. No.: 455,315

[22] Filed: May 30, 1995

[51] Int. Cl.⁶ .................................................. B64C 27/18
[52] U.S. Cl. ....................... 416/20 R; 416/20 A; 244/207
[58] Field of Search ................................ 416/20 R, 20 A, 416/22, 174; 244/207, 17.19, 73

[56] References Cited

U.S. PATENT DOCUMENTS

| | | | |
|---|---|---|---|
| 2,761,635 | 9/1956 | Hiller, Jr. et al. | 244/17.19 |
| 2,994,384 | 8/1961 | Steven | 170/135.4 |
| 2,994,495 | 8/1961 | Lubben et al. | 416/20 R |
| 3,159,360 | 12/1964 | Ryan et al. | 244/17.19 |
| 3,830,588 | 8/1974 | Nagler | 416/20 A |
| 3,843,282 | 10/1974 | Nagler | 416/20 |
| 4,371,314 | 2/1983 | Davel et al. | 416/20 A |
| 4,473,335 | 9/1984 | Henry | 416/20 A |

FOREIGN PATENT DOCUMENTS

| | | | |
|---|---|---|---|
| 5213280 | 8/1993 | Japan | 416/22 |
| 0265706 | 3/1950 | Switzerland | 416/20 R |

*Primary Examiner*—Edward K. Look
*Assistant Examiner*—Mark Sgantzos
*Attorney, Agent, or Firm*—Drummond & Duckworth

[57] ABSTRACT

A helicopter rotor seal for gas-driven helicopters wherein the rotor is rotatably driven by a compressed air jets at the tips of the rotors directed rearwardly with respect to rotor rotation. A non-rotatable mast extends vertically from the helicopter fuselage including a concentric bore for communication of compressed air therethrough. Positioned at the upper extremity of the mast, above the rotor blades, is a rotatable plenum for distributing compressed gas to the helicopter's respective rotor blades.

2 Claims, 3 Drawing Sheets

HELICOPTER ROTOR SEAL ASSEMBLY

The present invention relates to helicopters, and more particularly, to gas-driven helicopters of the type wherein the rotor is driven by compressed air jets at or near the tips of the helicopter rotor blade.

In most common constructions for helicopters, which generally is employed both in commercial and military helicopters at the present time, the rotor of the helicopter is caused to rotate by connecting the rotor to the engine through some type of transmission. These include various mechanical interconnections of the rotor to an engine which generally includes such conventional systems as a reciprocating internal combustion engine or a turbine engine.

Several disadvantages are inherent in such conventional systems. The primary disadvantage is that significant high torque loads are placed on the structure which is used to support the vertical shaft connecting the rotor blades with the engine. Accordingly, the structural frame of the helicopter must be unduly strengthened necessitating undue weight to the aircraft. Further, this torque to the vertical shaft must be counteracted to prevent a counter-rotation of the body of the helicopter with respect to the rotor. Typically, this is accomplished by provision of an additional small tail rotor which is mounted at right angles to the helicopter body. The speed of rotation or force which is applied to the tail rotor the body of the helicopter must be coordinated with the driving power applied to the main rotor blades in order to obtain stable operation of the helicopter. An enormous amount of stress is thereupon placed on the structural members of the helicopter as well as the transmission used to interconnect the engine with the main rotor and the tail rotor. This conventional construction requires relatively large numbers of rotating and moving parts which must be utilized to drive the two rotors. Many bearings, operating under significant stress must be employed. These beatings are costly and require frequent and expensive maintenance.

Not only must the hub design for the rotor be such as to permit rotation about the vertical axis, but the hub must be configured to permit angular movement with respect to the vertical rotor shaft to a predetermined number of degrees. Angular control of the hub and the corresponding rotor blades is generally effected through a swash plate at the hub which is then connected to manual control within the helicopter through a plurality of control rods.

Due to the large number of moving parts and complexity of design, a conventional helicopter requires considerable maintenance and repair hours at a significant cost factor.

To reduce the mechanical and structural problems which have been described above, other approaches have been attempted. An early attempt was that of using a jet engine, or turbine, at the tip of each of the rotor blades. Such a configuration completely removed the structural requirements of placing an engine in the helicopter fuselage and transmitting its emitted power through a complicated transmission system. Unfortunately, it became necessary to transport fuel from the helicopter body through the fixed rotor support shaft and into the rotating rotor blades to the engine. This presented an extreme safety hazard because the highly volatile fuel was prone to leak between the hub at the non-rotating rotor shaft and the rotating rotor blades.

In order to take advantage of the structural advantages associated with the rotor blades being propelled by jets at the rotor blades tips, without the problems of conveying volatile fuel to the jet engines, designs emerged utilizing the flow of pressurized air driven along the vertical rotor mast to hollow blades was developed. In systems using this type of design, a flow of air passes through the rotor blades to nozzles which are directed rearwardly, located at or near the tips of each of the blades. Air discharging through the nozzles result in reactive forces in the opposite direction thereby rotating the blade about the hub. A variety of attempts to develop helicopters using the concept of air driven rotors have been made in the past.

The concept of a compressed gas-driven helicopter rotor theoretically appears to be an ideal concept for powering a helicopter. By causing the reactive forces to take place at the tips of the rotor blades, no counter-rotating stress is applied from the rotor to the body of the helicopter so an additional tail rotor which is conventionally used is not necessary. In addition, a truly free-wheeling rotor is able to go into auto rotation mode in the event of a power failure, thereby enhancing the likelihood of a safe landing.

One of the earlier designs is disclosed in a patent to Stevens, U.S. Pat. No. 2,994,384. Stevens proposed a helicopter wherein an air compressor having a housing rotatable in unison with the rotor is disposed above the rotor blades. The impeller of the compressor is driven at high speed by power derived from an engine on the fuselage. In one embodiment, the compressor is connected to the engine by means of an impeller drive shaft driven by a turbine. In an additional embodiment, the compressor is powered through a drive shaft driven by a conventional internal combustion engine. Unfortunately, such a construction still imposed great loads on the rotor structure because the compressor had to be mounted above the rotor blades. Further, the design required numerous bearings and seals carrying radial and axial thrust loads which had to be periodically replaced. Additionally, the design required a torque transmission shaft to be disposed within the rotor shaft for connecting the engine with the air compressor requiting additional structural support involving additional complexity and corresponding maintenance.

Air-driven helicopter rotors are disclosed in the patents to Nagler, U.S. Pat. No. 3,830,588 and U.S. Pat. No. 3,843,282. Both patents disclose an air-driven helicopter which has a hollow rotor shaft connected to an air pressure source to convey a flow of air through the rotor shaft to the rotor hub. A concentric rotor mast is supported within the upper portion of the hollow rotor shaft by radially extending support struts which engage the inner wall of the hollow rotor shaft. A hub is rotatably affixed to the upper extremity of the rotor mast. Engaging the hub and rotating about the rotor mast are the corresponding rotor blades. The design further includes separate air seals and a separate spherical bearing to handle the tilt of the rotor blades. Unfortunately, with such a construction, all of the axial loads and bending moments transmitted by the rotor blades are placed upon the relatively narrow rotor mast. Further, these loads are thereupon transmitted to the support struts which are configured across the bore of the hollow rotor shaft thereby impeding the communication of gas flow to the rotor blades.

One of the more recent air-driven helicopter systems is disclosed in the patent to Dauel, et at., U.S. Pat. No. 4,371,314. The design includes a hub connected to a rotatable mast shaft by a teetering hinge. The mast shaft is supported at its lower extremity by a thrust beating. Providing compressed air to each rotor is a stationary plenum chamber which surrounds the mast shaft which sealably joins a rotatable plenum chamber which is fluidly connected to the underside of the rotor blades. Unfortunately, such a configuration does not provide for one of the primary advantages of an air-driven rotor system, that of a non-rotatable mast shaft. Accordingly, the Dauel design requires multiple air seals and bearings. Further, the stationary plenum chamber must be of a sufficient cross-section to provide air flow around the mast shaft requiring additional structural support.

A similar concept of an air-driven helicopter rotor hub assembly is disclosed in the patent to Henry, U.S. Pat. No. 4,473,335. The helicopter rotor hub includes a section of a spherically stainless steel ball attached to the end of a hollow rotor shaft. The rotor blades are mounted to the spherical stainless steel ball similar to that of a universal ball joint. An air compressor within the helicopter supplies air through the hollow rotor shaft to the hollow rotor blades which have discharge nozzles at the trailing edges on their tips. Unfortunately, all of the axial and radial thrust loads imparted by the rotor blades are transmitted to the rotor seal, the spherical stainless steel ball. Accordingly, the seal is subject to considerable wear and due to its somewhat unique configuration is complicated to manufacture and replace.

SUMMARY

The present invention addresses the aforementioned disadvantages by providing a helicopter rotor seal assembly in which a rotatable plenum is mounted above the rotor blades. The apparatus utilizes a minimum of air seals that carry little or no axial or radial loads. The use of a non-rotatable mast shaft eliminates the transmission of rotor blade torque to the fuselage of the aircraft. The necessity for a vertically extending tail rotor is thereby eradicated. Further, only a single bearing is necessary near the seal, thus reducing the cost and maintenance of the aircraft.

In a preferred embodiment of the present invention, an air driven helicopter includes a fuselage, a compressed air source, an air distribution system, and a pitch control system. A non-rotatable rotor mast extends vertically from the helicopter fuselage to support a plurality of hollow rotor blades. The rotor mast is substantially cylindrical in configuration and includes a concentric bore disposed along the mast's vertical axis for communicating compressed gas therethrough to the rotating rotor blades.

The present invention also includes a rotatable plenum, positioned above the rotor blades and rotor mast, which is formed with a lower extremity having a horizontally planar annular surface, and a concentric circular orifice opening into a plenum cavity. The plenum's annular surface engages the upper extremity of the cylindrical rotor mast to inhibit the escape of gas passing through the rotor mast and rotatable plenum. The rotatable plenum further includes a flange which radially extends from the lower extremity of the rotatable plenum to enclose the upper extremity of the rotor mast. A ball bearing, having a standard configuration well known to those in the art, is interposed between the rotatable plenum and the rotor mast. The ball bearing is concentrically positioned at the upper extremity of the rotor mast such that the bearing's inner ring engages the rotor mast's outer sidewall. The plenum's radially extending flange engages the outer ring of the ball bearing to provide a horizontally and vertically affixed plenum which rotates about the vertical axis. The preferred embodiment of the rotatable plenum further includes radially extending conduits for communicating compressed gas, passing through the rotor mast, to the individual helicopter rotor blades.

A circular seal is disposed between the non-rotatable rotor mast and the rotatable plenum. As would be recognized by those in the art, the seal comprises a single "O" ring or a plurality of radially or longitudinally displaced "O" rings to provide seal redundancy. Because the adjacent ball bearing supports substantially all radial and axial thrust loads transmitted by the rotatable plenum, the seal wears at a significantly reduced rate, thereby reducing maintenance and operational costs. Further, the ball bearing supports only the structural loads transmitted by the rotatable plenum and not the thrust loads transmitted by the rotor blades. Accordingly, the ball bearing also incurs minimal wear, little maintenance and low operating costs.

An advantage of positioning the rotatable plenum above the rotor blades and rotor mast is that the mast is non-rotating. Accordingly, the mast does not transmit or support rotor blade torque to the aircraft fuselage, thus eliminating the necessity of a tail rotor mounted at right angles to the helicopter body and the corresponding structural member necessary for supporting such a tail rotor. Further, the rotor mast inner bore is unobstructed by load supporting struts, which may impair the passage of compressed gas therethrough. Accordingly, the rotor mast provides a highly efficient conduit for directing compressed gas to the hollow rotor blades.

An additional advantage of the rotor seal assembly is that it is inherently "anti-icing," in contrast to having mere "de-icing" capability. The compressed air that is directed through the inner bore of the rotor mast, the rotatable plenum and rotor blades is at high temperatures, typically over 400° F., due to compression heating. Accordingly, the hub and seal assembly, and rotor blades are constantly being bathed in hot gases, thus not only providing the capability of removing accumulated ice from the rotor-hub-plenum structure, but also reducing the propensity of the rotor blades, hub, and bearings to begin icing during cold weather.

Further, by positioning the rotatable plenum above the rotor blades and rotor mast, the rotor seal assembly only requires a single seal that supports minimal loads, incurs minimal wear and requires little maintenance. Likewise, the only bearing positioned in proximity to the seal supports only the relatively light-weight plenum and sees no thrust loads transmitted by the rotor blades. Accordingly, the bearing also incurs minimal wear and requires little maintenance.

An additional advantage of the present invention is that the aircraft produces little noise. The elimination of an internal combustion reciprocating engine, transmission, and rotating mast shaft with its corresponding bearings and seals, provides for an aircraft that is substantially noiseless.

Another advantage of the present helicopter rotor seal is that the assembly is less expensive to manufacture, employing standard casting and machining processes.

Other features and advantages of the present invention will be appreciated by those skilled in the art upon reading the detailed description which follows with reference to the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
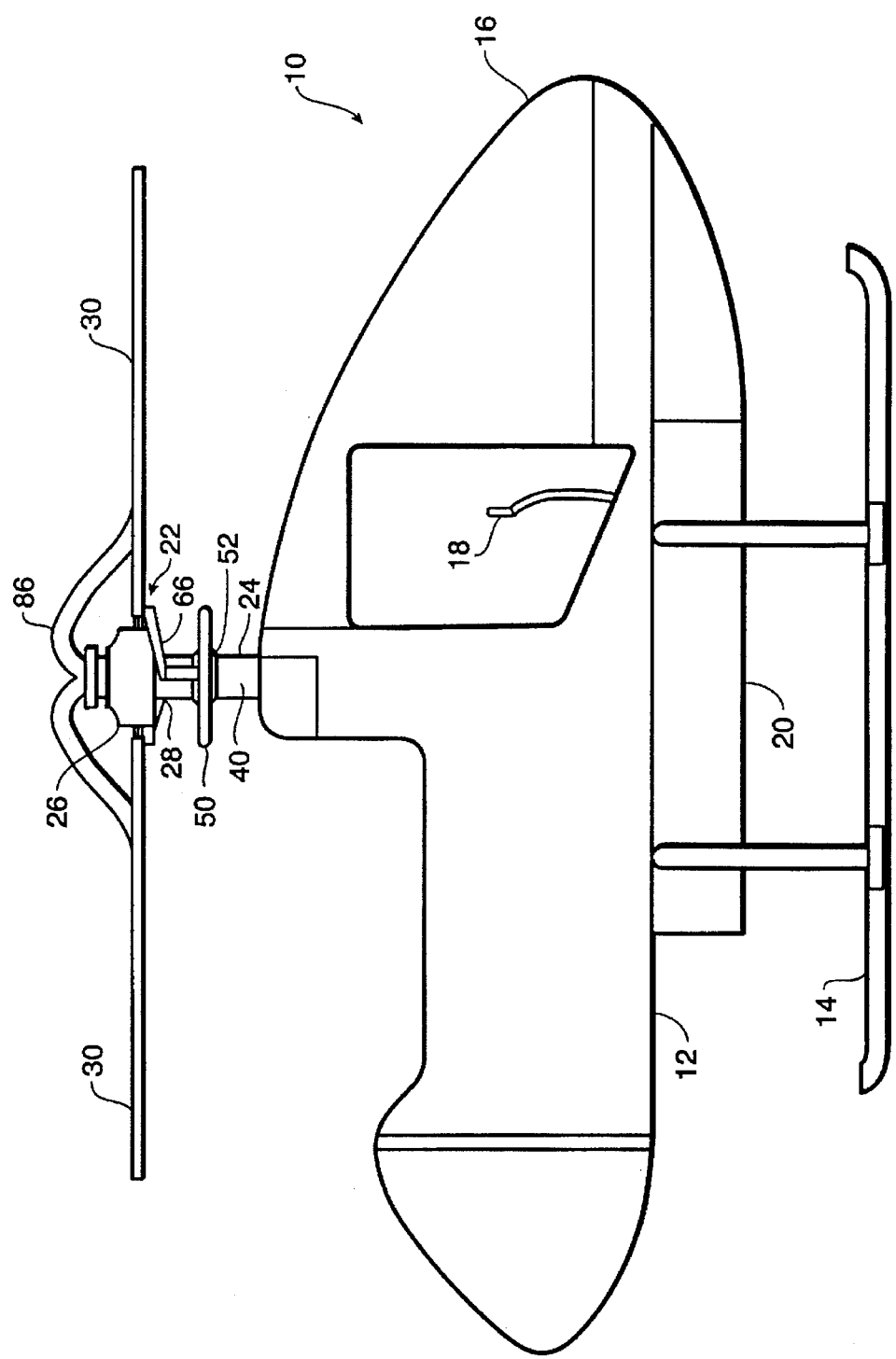
FIG. 1 is a side view of a helicopter including the rotor seal of the present invention.

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

Figure 2:
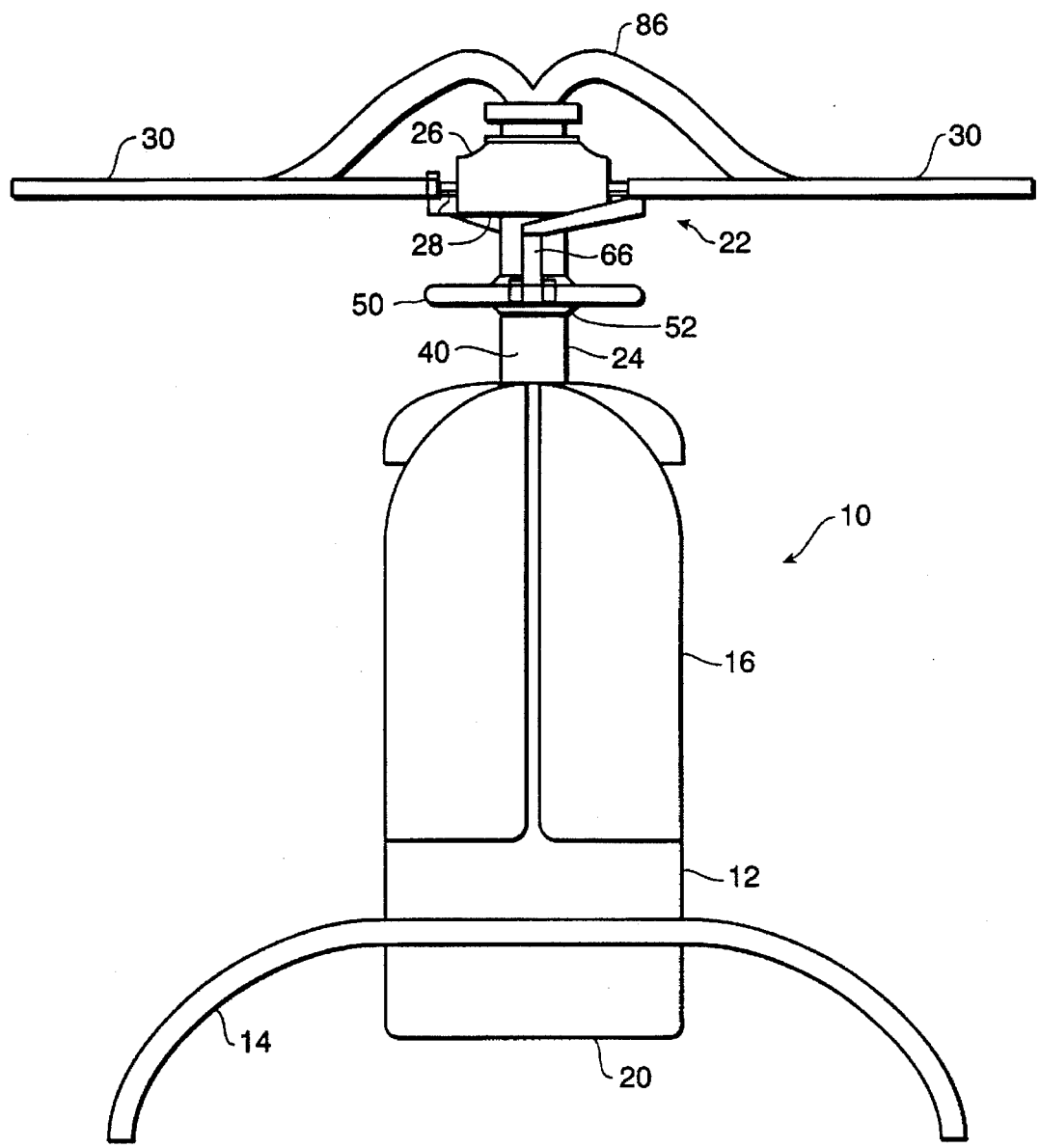
FIG. 2 is a frontal view of a helicopter including the rotor seal of the present invention.
Figure 3:
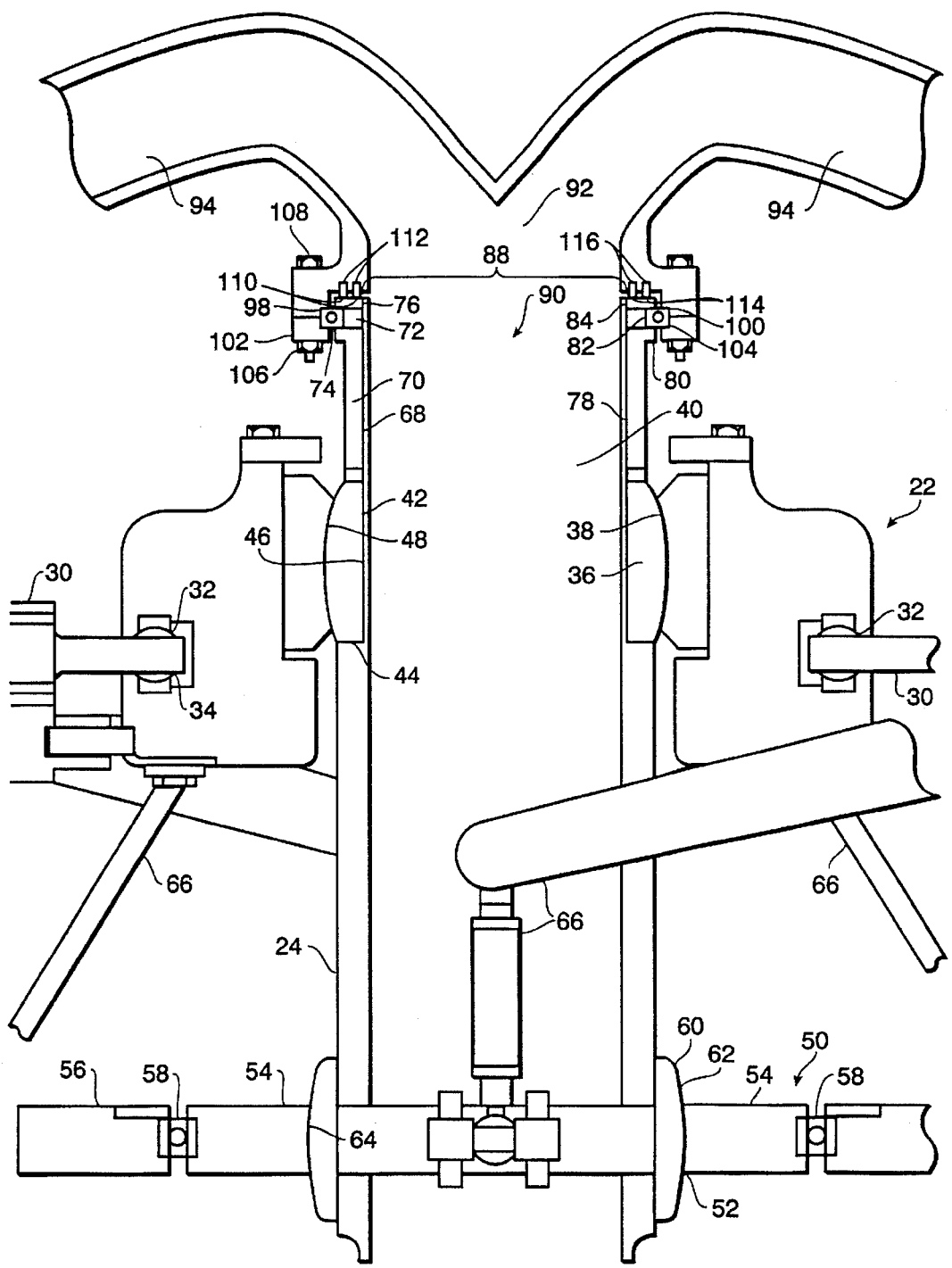
FIG. 3 is a enlarged cross-sectional side view of the rotor seal as shown in FIGS. 1 and 2.

As shown in the exemplary drawings where like numerals represent like elements, the invention is embodied in a helicopter rotor seal in which a rotatable plenum is disposed above the rotor blades. Referring to FIGS. 1, 2 and 3, the fuselage 12 of helicopter 10 is supported by landing gear 14. The helicopter 10 typically also includes a cockpit 16, control stick 18, fuel tanks 20 and a compressed gas source (not shown) typically positioned at the rear of the fuselage. These pans can be widely varied and do not of themselves constitute any part of the invention.

The helicopter further includes a vertical thrust transmitting rotor 22 connected to the fuselage 12 by a longitudinally extending rotor mast 24 for rotation about a substantially vertical axis. The rotor includes a rotatable hub 26 formed with a central bore 28 concentric with the vertical axis of the rotor mast 24 and a plurality of radially extending rotor blades 30 uniformly spaced around the central vertical axis. Only two blades are shown for example, but the helicopter may include more as needed. Each blade includes a radial conduit (not shown) adapted to receive gas under pressure. The radial conduit traverses the length of the rotor blade 30 to terminate at the blade's tip at a jet nozzle (not shown). The jet nozzle is adapted to discharge gas tangentially and rearwardly with respect to the rotation of the rotor blade to produce reactive forces in the opposite direction thereby rotating the rotor blade about the hub. Each rotor blade is also adapted for limited adjustment. At the inner extremity of each rotor blade is formed a ball 32 which is affixed to the rotatable hub 26 by a socket 34 formed in the hub. The ball and socket assembly radially affixes the rotor blade, permitting the blade to move upwardly or downwardly about a transverse horizontal axis through the center of the ball 32 and to permit the blade 30 to adjust pitchwise about a radial axis passing through the center of the ball.

Preferably, the rotor hub 26, rotatably connected to the rotor mast 24, is adapted for adjustment of its axis of rotation. To this end, the rotor mast includes an annular flange 36 having a spherically convex surface 38. Referring to FIG. 3, in a preferred embodiment, the rotor mast 24 is configured as a longitudinally extending tube with a concentric bore telescoping therethrough. At the upper extremity of the rotor mast is an annular recess 42 having a predetermined diameter less than the outer diameter of the rotor mast and terminating at a mast abutment 44. In this manner, the annular flange 36 may be configured as an easily removable and replaceable part having an outer spherically convex surface 38 and a vertically extending concentric bore 46 having a diameter formed for telescopic receipt of the upper extremity of the rotor mast 24 and engagement with the mast abutment 44. Frictionally engaging the spherically convex surface of the rotor mast's annular flange is the spherically concave surface 48 formed in the interior of the rotatable hub 26. The annular flange and concave surface of the rotatable hub collectively constitute a substantially spherical joint permitting adjustment of the hub's substantially vertical axis and rotation about said axis.

Controlling the adjustment of the rotor blades 30 is a swash plate 50 affixed to the rotor mast 24. The swash plate is a radially extending dish formed with a concentric bore 52 passing through the vertical axis of swash plate. The swash plate includes two concentric rings, an inner ring 54 and an outer ring 56, interposedly engaged by a ball beating 58, thereby allowing the outer ring to rotate about the vertical axis relative to the inner ring. Affixing the swash plate to the rotor mast is a second radially extending flange 60 formed on the rotor mast below the rotor blades. The rotor mast's second flange also has a spherically convex surface 62 which mates to a corresponding spherical concave surface 64 formed in the inner bore 52 of the swash plate 50. In similar manner to the rotor hub, the spherical convex and concave surfaces of the swash plate and rotor mast collectively constitute a substantially spherical joint permitting angular adjustment of the swash plate's vertical axis while permitting the outer ring 56 of the swash plate to rotate about said axis. As shown in FIG. 3, the outer ring of the swash plate further includes longitudinally extending linkages 66 engaging the respective rotor blades 30. By means not fully shown here, but well understood by those in the art, the swash plate 50, linkages 66, and rotor blades 30 are controlled by a collective pitch stick 18 (FIG. 2) operable by the pilot to tilt the azimuth axis forwardly and rearwardly, and to cyclically change the pitch of the rotor blades to fully control the aircraft.

Referring to FIG. 3, the non-rotatable rotor mast 24 extends vertically from the helicopter fuselage. Longitudinally telescoping through the mast is a concentric bore 40 for directing compressed gas to the rotor blades. The upper extremity of the rotor mast, above the spherical flange supporting the rotor hub, is threaded on its outer surface 68 to permit threaded engagement of a plurality of parts. From lowest to highest, a rotor retention nut 70, a bearing spacer 72, a bearing 74, and a bearing locknut 76 are threadably installed onto the threaded portion 68 of the rotor mast. The rotor retention nut is an annular ring having a threaded inner surface 78 of a diameter corresponding to the outer diameter of the threaded portion of the rotor mast. At the upper extremity of the rotor retention nut is a radially extending bearing flange 80 for engagement with a ball bearing 74 disposed thereon. Positioned above the rotor retention nut is a bearing spacer 72 which may be either threaded or affixed to the rotor mast by engagement with the threaded locknut 76 installed above the bearing spacer 72. The bearing spacer 72 is an annular ring having a outer diameter less than the outer diameter of the radially extending flange 80 formed on the rotor retention nut. In this configuration, a standard ball bearing, having an inner bore of a diameter equal to the outer diameter of the bearing spacer, is affixed to the rotor mast 24 by telescopically receiving the bearing spacer in bearing's inner bore 82. The bearing is thereby restricted from longitudinal movement at its lower extremity by the rotor retention nut 70 and at its upper extremity by the bearing locknut 76. The locknut, which is also an annular ring having a threaded inner surface 84 threadably engaging the upper extremity of the rotor mast, has an outer diameter greater than the outer diameter of the bearing spacer, and the inner diameter of the bearing.

A rotatable plenum is disposed above the rotor mast. The rotatable plenum 86 includes an annular lower surface 88, configured to contact the upper surface of the rotor mast locknut, and an orifice 90 concentric with vertical axis of the rotor mast having a diameter substantially equivalent to the inner bore of the rotor mast. The plenum orifice 90 opens into a plenum cavity 92 which is formed with a plurality of plenum conduits 94. The plenum conduits correspond in number to that of the rotor blades, as shown two, and function to direct compressed gas passing through the rotor mast and rotatable plenum to the rotor blade conduits. At the plenum's annular lower surface is a radially extending flange 96 configured to surround the upper extremity of the rotor mast and locknut to engage the upper portion of the bearing's outer ring 98. The plenum flange is formed with a circular recess 100 to receive the upper portion of the bearing's outer ring 98. To affix the rotatable plenum to the bearing's outer ring 102 is a bearing retention ring which is an annular ring having an inner diameter larger than the outer diameter of the rotor retention nut flange and formed with a circular recess 104 for receipt of the lower portion of the bearing's outer ting 98. Affixing the bearing retention ting to the plenum flange and thus interposedly affixing the bearing's outer ring, may be any fastener used in the art, typically a nut 106 and bolt 108.

Providing a seal 110 between the rotatable plenum and the rotor mast are one or more "O" rings 112 positioned between the plenum 86 and the rotor mast 24. As would be recognized by those in the art, the "O" ring may be disposed either on the outer cylindrical surface of the mast assembly, such as the outer surface of the rotor retention nut 70 or locknut 76, or on the upper annular surface 114 of the locknut. In a preferred embodiment, the lower annular surface 88 of the rotatable plenum is notched with one or more circular recesses 116 for receipt of one or more "O" rings 112. As shown, the rotatable plenum includes two recesses 116 for receipt of two "O" rings 112 to provide seal redundancy. Further, in a preferred embodiment, the locknut 76 is manufactured of highly polished chromium steel to provide an excellent low friction sealing surface upon which the seal rotates. To provide further seal redundancy, the "O" rings are "X" in cross-section, 3 mm. in diameter, and manufactured from Viton material. The seals are thus flexible, durable and temperature resistant. Meanwhile, the plenum is manufactured from 6061 T6 aluminum to provide a structurally sturdy, yet light-weight compressed gas distribution system.

In operation, high energy gas from the compressed gas source is directed through the rotor mast bore to the rotatable plenum. The gas is then directed through the plenum conduits to the rotor blade conduits traversing the rotor blades. The compressed gas is then expelled from the jet nozzles disposed at the outer extremities of the rotor blades to rotationally propel the rotor. Therein is provided a highly efficient rotor assembly. The rotor mast is unobstructed by structural elements and the like which may impede the passage of compressed gas from the compressed gas source to the rotatable plenum and thereafter to the rotor blade jets. Further, the necessity of a tail rotor at tight angles to the helicopter fuselage is eliminated because rotor blade torque is not transmitted through the rotor mast.

The above rotor seal configuration provides for a rotatable plenum to be mounted to the upper extremity of a rotor mast above the rotor blades. The ball beating enables the plenum to be rotated around the vertical axis, pulled by the plenum conduits attached to the rotor blades. The plenum flange and bearing retention ring, however, restrict longitudinal and lateral movement of the plenum relative to the rotor mast. The positioning of the rotatable plenum above the rotor blades and rotor mast provides for numerous advantages. For example, the single bearing at the seal area supports a relatively lightweight rotatable plenum and accordingly requires little maintenance. Further, the assembly includes a single sealing area, comprising two "O" rings, which do not support the axial or radial forces transmitted from either the rotor blades or the rotatable plenum. Accordingly, the "O" rings require seldom replacement or maintenance. Another advantage is that the assembly is simple to manufacture and assemble, employing casting and machining principles well known to those in the art.

Although the present invention has been described with reference to the preferred embodiment, workers skilled in the art will recognize that changes may be made in form and detail without departing from the spirit and scope of the invention.

What is claimed is:

1. In an air driven helicopter, having a fuselage, a compressed gas source, an air distribution system, hollow rotor blades, a pitch control system, and a helicopter rotor seal for providing a seal to a rotating plenum, the helicopter rotor seal assembly comprising:

(a) a non-rotatable longitudinally extending rotor mast including a vertical axis, said rotor mast further including a concentric bore for directing compressed gas therethrough, said concentric bore being disposed along said vertical axis thereof to define a tubular sidewall having an inner surface and a outer surface, said rotor mast terminating at its upper extremity with a sealing surface;

(b) a bearing having an inner ring and an outer ring, said inner ring affixed to the outer surface of said rotor mast;

(c) a rotatable plenum mounted above the helicopter rotor blades and rotatable only about said vertical axis of said rotor mast, said plenum rotatably affixed to the upper extremity of said rotor mast for receiving compressed gas from said bore and for directing compressed gas to said rotor blades;

(d) a seal means disposed between said sealing surface of said rotor mast and said rotatable plenum for affecting a substantially fluid-tight connection therebetween;

(e) a substantially convex spherical flange concentrically affixed to said rotor mast; and (f) a rotatable hub for supporting the helicopter rotor blades, said rotatable hub having an internal substantially concave spherical surface matingly engaging the external surface of said spherical flange for providing three-axis (pitch, roll and yaw) rotation thereabout.

2. In an air driven helicopter, having a fuselage, a compressed gas source, an air distribution system, hollow rotor blades, a pitch control system, and a helicopter rotor seal for providing a seal to a rotating plenum, the helicopter rotor seal assembly comprising:

(a) a non-rotatable longitudinally extending rotor mast including a vertical axis, said rotor mast further including a concentric bore for directing compressed gas therethrough, said concentric bore being disposed along said vertical axis thereof to define a tubular sidewall having an inner surface and a outer surface, said rotor mast terminating at its upper extremity with a substantially planar upper surface;

(b) a bearing having an inner ring and an outer ring, said inner ring affixed to the outer surface of said rotor mast;

(c) a rotatable plenum including a substantially planar annular lower surface, said plenum mounted above the helicopter rotor blades and rotatably affixed to the upper extremity of said rotor mast such that said plenum's annular lower surface adjoins said mast's annular upper surface, said plenum configured for receiving compressed gas from said bore for directing compressed gas to said rotor blades; and (d) a seal means disposed between said annular upper surface of said rotor mast and said annular lower surface of said rotatable plenum for effecting a substantially fluid-tight connection therebetween.

* * * * *